Patented May 29, 1923.

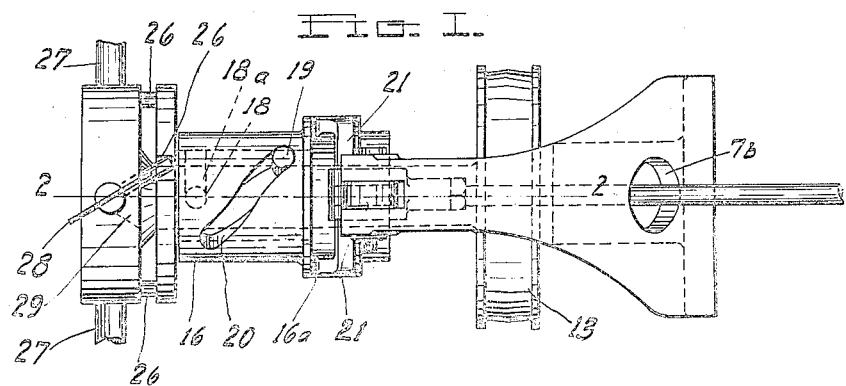
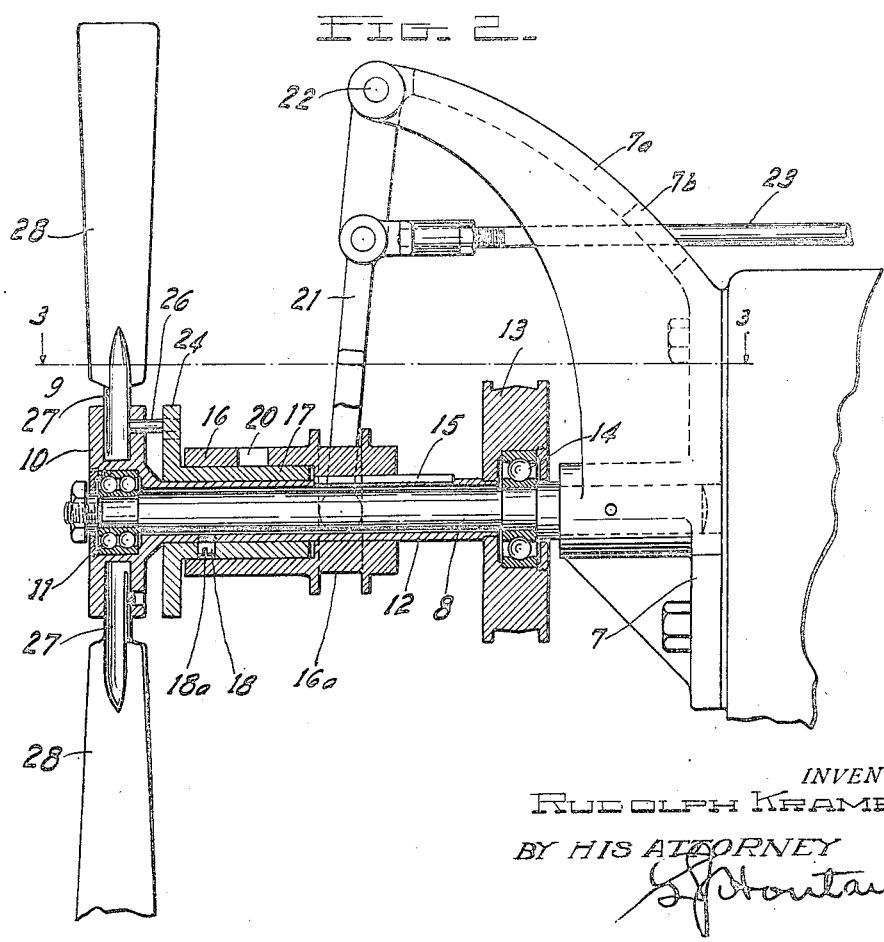

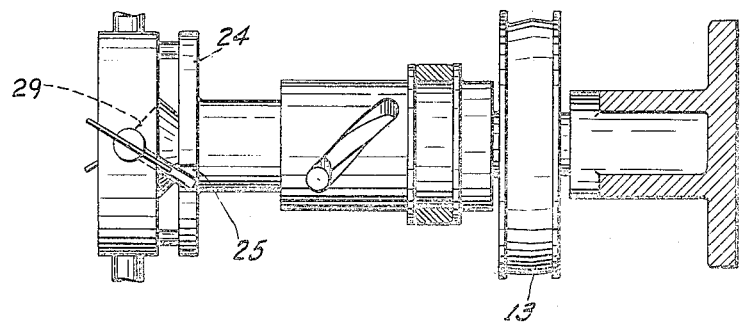
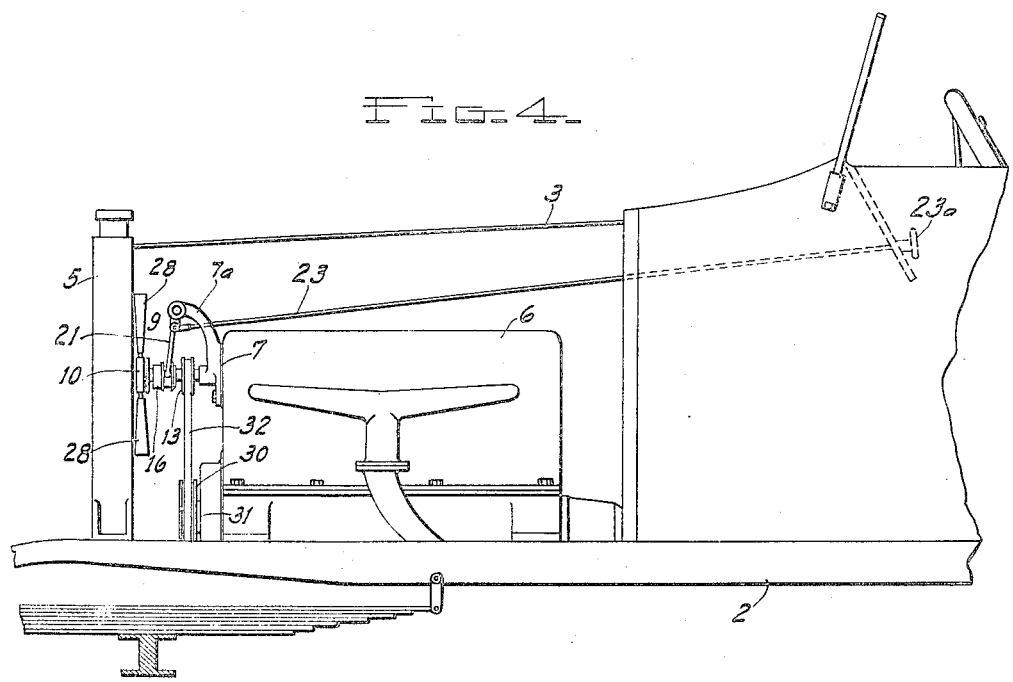

1,456,699

UNITED STATES PATENT OFFICE.

RUDOLPH KRAMER, OF SHEYENNE, NORTH DAKOTA.

AIR-CIRCULATING SYSTEM.

Application filed September 2, 1921. Serial No. 498,115.

*To all whom it may concern:*

Be it known that I, RUDOLPH KRAMER, a citizen of the United States, and resident of Sheyenne, in the county of Eddy and State of North Dakota, have invented certain new and useful Improvements in Air-Circulating Systems, of which the following is a specification.

This invention relates to air circulating devices, having reference particularly to an improved mechanism for circulating air adjacent to an automobile motor.

In circulating devices of this character it has been customary to draw outside air through a water-circulating radiator, for the purpose of cooling the motor, by employing a suction fan which is operated by the motor; and in very cold weather the water in the radiator frequently freezes, thus injuring the structure.

My invention has for its principal object the provision of means for exhausting warm air from around the motor and passing it through the radiator to obviate such liability of freezing, by providing a fan of novel construction which is adaptable for alternate use as a means for circulating cool air around the motor and drawing warm air from its hood or casing and expelling it through the radiator.

In carrying out my invention, I provide a convertible fan which may be employed either for drawing outside air through the radiator and circulating it around the motor or for drawing warm air from the motor hood and expelling it through the radiator, constituting a convertible fan, means for reversing the pitch of the fan blades, whereby they may be alternately employed for drawing and expelling air, and means for operating the device from the automobile at a point adjacent to the driver's seat, all as hereinafter fully described and specifically set forth in the appended claims.

In the accompanying drawings forming part of this specification, Figure 1 is a plan view illustrating an embodiment of my improvements;

Fig. 2 is a longitudinal sectional view taken on the line 2—2 of Fig. 1;

Fig. 3 is a sectional plan view taken on the line 3—3 of Fig. 2; and

Fig. 4 is a fragmentary view of the forward part of an automobile having my improvements attached thereto.

In the drawings, 2 indicates a part of the automobile chassis, 3 the motor hood, 4 the forward part of the body, 5 the radiator, and 6 the motor.

On the forward end of the motor casing is mounted a bracket 7, having a horizontal spindle 8, extended forwardly therefrom, upon which the fan 9 rotates.

The fan comprises a hub 10 mounted on ball bearings 11, and having an extended sleeve 12 carrying a fixed pulley 13 which is mounted on ball bearings 14. Slidably engaging the sleeve 12, by means of a key 15, is a cylindrical collar comprising an outer member 16 and a telescopically connected member 17, which is secured against slidable movement on the sleeve 12 by means of a screw 18, which extends through a slot $18^a$ and is threaded into the sleeve member 12 of the fan hub 10.

Radially extended from the member 17 is a pin 19, which extends through a helical cam-slot 20 of the collar 16, whereby rearwardly slidable movement of said collar rotates the member 17. The collar 16 is provided with an annular channel $16^a$ for the accommodation of a forked rod 21, which oscillates on an arm $7^a$ of the bracket 7, by means of a pivot 22. Pivotally connected to the forked rod 21 is an elongated draw bar 23 which passes through an aperture $7^b$ of the arm $7^a$ and extends into the car, a handle or knob $23^a$ being provided for operating the rod.

Formed integral with the member 17 is an annular flange 24, having peripheral recesses 25 which engage rearwardly projecting pins 26, extended respectively from the shanks 27 of the propeller blades 28. These pins 26 swing in tapered slots 29 of the hub 10, whereby the swing of the blade is limited, as shown in Figures 1 and 3 of the drawings.

In the operation of my invention, the pulley 13 is connected with a pulley 30, mounted on the motor shaft 31, by means of a belt 32; and when it is desired to draw outside air through the radiator the fan blades are set in position shown in Fig. 1 of the drawing, the pitch of the blades then being set to draw air inwardly. Then when it is desired to draw warm air from the hood and expel it through the radiator the forked rod 21 is oscillated rearwardly by means of the draw bar 23, whereby the collar 16 is moved rearwardly into position, shown in Fig. 3 of the drawings, and the member 17 is rotated sufficiently to swing the fan blades in the reverse position shown in said Fig. 3, for the purpose of drawing warm air from the hood 3 and expelling it through the radiator, whereby the same may be warmed sufficiently to prevent freezing of the water contained therein.

I do not wish to be understood as confining myself to the specific details of mere mechanical construction and correlation of the elements of my improvements as herein shown and described, as under the spirit of my invention and the scope of the appended claims, I believe that I am entitled to the employment of slight variations of mere mechanical detail.

Having thus described my invention, what I claim as new and desire to secure by Letters Patent, is:

1. In a device of the character described, a fan comprising a hub having slots in the rear face thereof, radially extending blades having respectively a shank turnably journaled through said hub and a rearwardly extending pin for extension through said slots, said hub having a rearwardly extending sleeve, and a pulley mounted on said sleeve, and a collar turnably mounted on said sleeve, and means for limiting the turnable movement in relation to said sleeve, said collar having a peripherally recessed flange for engaging said pins, and a reciprocative element for operating said collar, and means for actuating said element.

2. In a device of the character described, a fan comprising a hub having slots in the rear face thereof, radially extending blades having respectively a shank turnably journaled through said hub and a rearwardly extending pin for extension through said slots, said hub having a rearwardly extending sleeve, and a pulley mounted on said sleeve, and a collar turnably mounted on said sleeve, and means for limiting the turnable movement thereof in relation to said sleeve, said collar having a peripherally recessed flange for engaging said pins, and a reciprocative sleeve-element slidable on said collar and having means for rotating said collar to a limited degree, and means for actuating said sleeve-element comprising an oscillatory forked rod and a draw bar.

Signed at Sheyenne in the county of Eddy and State of North Dakota this 8th day of June A. D. 1921.

RUDOLPH KRAMER.